United States Patent
Ong

(10) Patent No.: US 7,502,126 B2
(45) Date of Patent: Mar. 10, 2009

(54) OPTICAL POSITION/MOTION TRACKING SYSTEM

(75) Inventor: Henson C. Ong, Waterbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 208 days.

(21) Appl. No.: 11/283,427

(22) Filed: Nov. 18, 2005

(65) Prior Publication Data

US 2007/0115485 A1    May 24, 2007

(51) Int. Cl.
*G01B 11/14* (2006.01)
(52) U.S. Cl. .................. 356/614; 356/622; 250/223 R
(58) Field of Classification Search ......... 356/614–623, 356/430–431, 628; 250/223 R, 559.24, 559.26, 250/559.21, 559.22, 224; 235/383, 437, 235/462.2
See application file for complete search history.

(56) References Cited

U.S. PATENT DOCUMENTS

| | | | | |
|---|---|---|---|---|
| 3,809,891 A * | 5/1974 | Erdman et al. | ........... | 250/222.1 |
| 4,402,609 A * | 9/1983 | Fetzer et al. | ................. | 356/640 |
| 4,762,990 A * | 8/1988 | Caswell et al. | .............. | 250/221 |
| 4,855,608 A * | 8/1989 | Peterson, II | ............ | 250/559.19 |
| 5,047,640 A * | 9/1991 | Brunnschweiler et al. | ........................ | 250/341.8 |
| 5,493,112 A * | 2/1996 | Welch | ......................... | 250/221 |
| 5,777,746 A * | 7/1998 | Dlugos | ........................ | 356/628 |
| 5,900,611 A * | 5/1999 | Hecht | ......................... | 235/454 |
| 5,909,210 A * | 6/1999 | Knox et al. | ................. | 345/168 |
| 5,920,056 A * | 7/1999 | Bonnet | ....................... | 235/383 |
| 7,022,971 B2 * | 4/2006 | Ura et al. | ..................... | 250/221 |
| 7,196,795 B2 * | 3/2007 | Ura et al. | ..................... | 356/437 |

* cited by examiner

*Primary Examiner*—Hoa Q Pham
(74) *Attorney, Agent, or Firm*—Brian A. Collins; Angelo N. Chaclas

(57) ABSTRACT

A system for tracking the spatial position/motion of an article conveyed along a feed path. The system comprises a reflective surface disposed along the feed path of the article and an optical scanning device disposed remotely from the reflective surface such that the moving article is interposed therebetween. The optical scanning device is operative to (i) transmit light energy along a length of the reflective surface, (ii) receive light energy returned from the reflective surface and (iii) determine the spatial position of the article based upon a condition of the optical path, i.e., whether the optical path is present or interrupted. A break in the optical path is sensed by the optical scanning device and interpreted by the signal processor to determine the spatial position/motion of the moving article.

16 Claims, 4 Drawing Sheets

OPTICAL POSITION/MOTION TRACKING SYSTEM

TECHNICAL FIELD

The present invention relates generally to a system for tracking the position and/or motion of an article or workpiece, and, more particularly, to a new and useful position/motion tracking system which facilitates assembly, installation and maintenance thereof. The position/motion tracking system is particularly well suited for adaptation to high-volume mailpiece inserter systems.

BACKGROUND OF THE INVENTION

Various apparatus are employed for determining the instantaneous position and/or rate of change of an article/body in motion. Such apparatus are commonly employed in manufacturing facilities where a work piece is conveyed along an assembly line and stopped/routed from one fabrication station to another. Generally, it is useful to record/store the precise location and/or velocity of the article/work piece in order to track useful parameters as such as efficiency, throughput, total capacity, rate of rejection/rework, etc. The instantaneous position of an article/work piece also may be used to initiate processes used in the fabrication of other assemblies/subassemblies.

One such apparatus, useful for describing the teachings of the present invention, is a mailpiece inserter system used for creating high-volume mail communications, e.g., mass mailings. Such mailpiece inserter systems are typically used by organizations such as banks, insurance companies and utility companies for producing a large volume of specific mail communications where the contents of each mailpiece are directed to a particular addressee. Also, other organizations, such as direct mailers, use mail inserters for producing mass mailings where the contents of each mailpiece are substantially identical with respect to each addressee. Examples of inserter systems are the 8 series, 9 series, and APS™ inserter systems available from Pitney Bowes Inc. located in Stamford, Conn., USA.

In many respects, a typical inserter system resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mailpiece is produced. The precise configuration of each inserter system depends upon the needs of each customer or installation.

Typically, inserter systems prepare mailpieces by arranging preprinted sheets of material into a collation, i.e., the content material of the mailpiece, on a transport deck. The collation of preprinted sheets may continue to a chassis module where additional sheets or inserts may be selectively added in view of a targeted audience of mailpiece recipients. From the chassis module the fully developed collation may continue to yet other stations for further processing. That is, the envelopes may be closed, sealed, weighed, sorted and stacked. Additionally, the inserter may include a postage meter for applying postage indicia based upon the weight and/or size of the mailpiece.

In addition to the various fabrication stations described above, a mailpiece inserter typically employs a mailpiece tracking system along the feed path of the inserter. That is, to track and/or make adjustments to the mailpiece fabrication process, the tracking system records and monitors the instantaneous position/location of each mailpiece "in process." As such, adjustments can be made to add different inserts and/or out-sort mailpieces which are discovered to have certain errors or deficiencies.

A typical mailpiece tracking system employs a plurality of photocells disposed at periodic and/or critical locations to ensure that each mailpiece is identified and tracked along the inserter feed path. Each photocell is disposed through aligned apertures formed in the inserter support deck so as to shine and/or receive reflected light in a direction orthogonal to the passing mailpiece. Moreover, the photocells are hardwired, in parallel, to a central controller/processor, e.g., 8051 boards. Light is shined on/reflected from a barcode identifier, or other distinguishing marks on the face of the mailpiece, and interpreted by the central processor. Each time a mailpiece passes a photocell, information concerning its identity and location are recorded/monitored.

While tracking systems which employ photocells have a long history of reliable service, the installation and the operational environment produces a variety of unique problems. More specifically, the large number of photocells required to obtain accurate and useable location data requires an extensive network of wiring beneath the inserter support deck. This extensive electronic network is laborious to install and similarly time-consuming to trouble-shoot should certain system errors be encountered. In large machines, wiring can span large distances, making it susceptible to electromagnetic interference (i.e., causing spurious signals). Furthermore, long wiring runs can impose resistance and impedance loads, which can degrade signal quality. Furthermore, the photocells are necessarily located in the mailpiece fed path where paper fibers and dust, from the thousands of envelopes processed hourly, are shed and collect on the support deck of the mailpiece inserter. In just several hours of operation, paper fibers can built to a significant thickness, cover the photocell apertures and occlude the transmission of light to/from the photocells. Consequently, the photocell apertures must be cleared of particulate matter on a regular/periodic basis. It will be appreciated, therefore, that mailpiece inserter systems which employ photocell position tracking systems are burdened by the cost of photocell installation, repair and maintenance.

A need, therefore, exists for a position/motion tracking system which is reliable, expedites installation, and facilitates maintenance/repair.

SUMMARY OF THE INVENTION

A system is provided for tracking the spatial position/motion of an article conveyed along a feed path. The system comprises a reflective surface disposed along the feed path of the article and an optical scanning device disposed remotely from the reflective surface such that the moving article is interposed therebetween. The optical scanning device is operative to (i) transmit light energy along a length of the reflective surface, (ii) receive light energy returned from the reflective surface and (iii) determine the spatial position of the article based upon a condition of the optical path, i.e., whether the optical path is present or interrupted. A break in the optical path is sensed by the optical scanning device and interpreted by the signal processor to determine the spatial position/motion of the moving article.

DESCRIPTION OF THE INVENTION

A system for tracking the position and/or motion of a mailpiece is described in the context of a mailpiece inserter system. While the inventive tracking system may be used in combination with a mailpiece inserter, it will be appreciated that the tracking system is equally applicable to other fabrication, transport and/or sortation systems. Furthermore, while the invention may be used for the purpose of tracking the position of a plurality of mailpieces, the inventive concepts may be adapted to monitor the location of any article, work piece or component in motion on a transport or conveyor deck.

Figure 1:
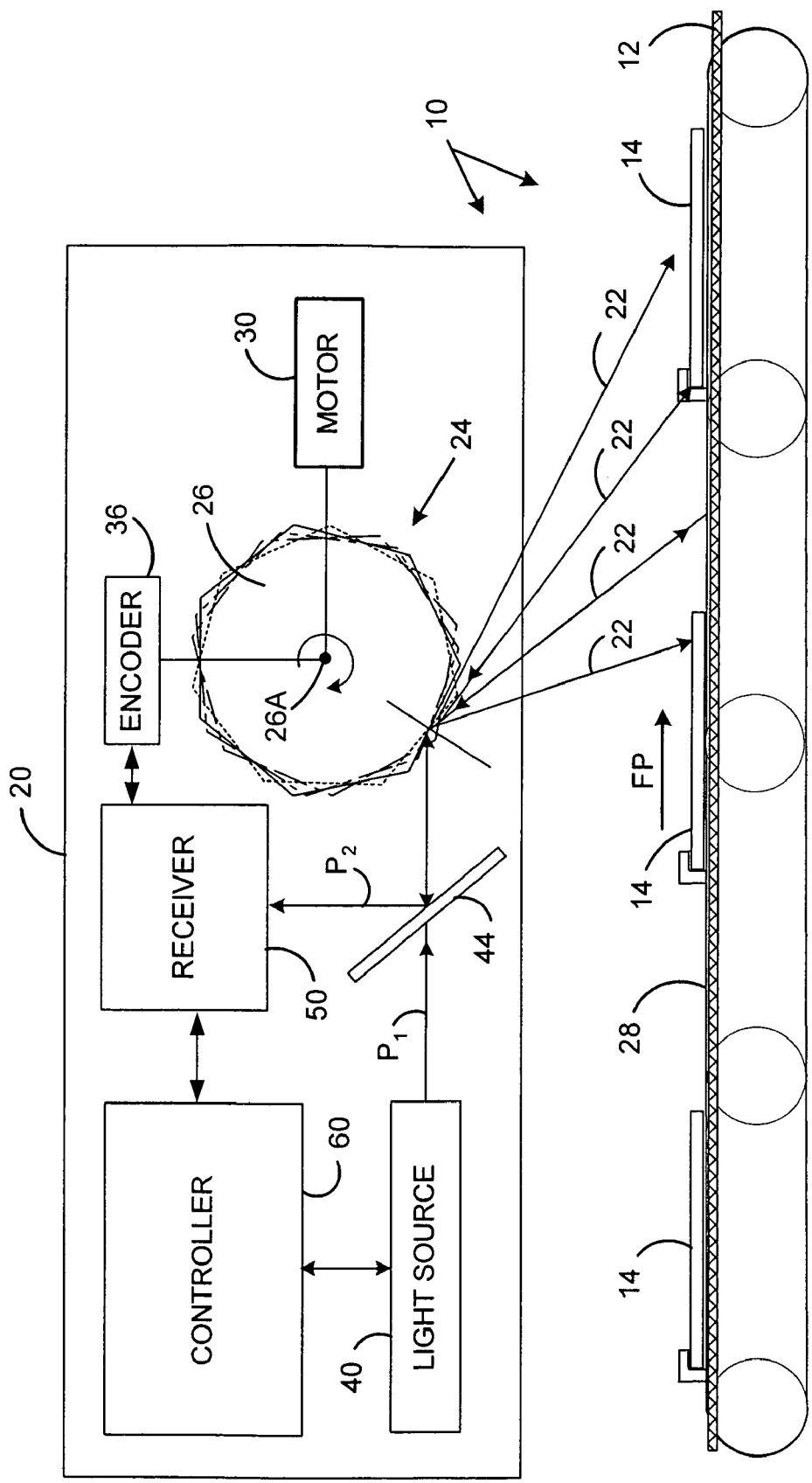
FIG. 1 is a schematic profile view of an optical tracking system according to the teachings of the present invention including a reflector strip disposed in combination with a transport deck for conveying a plurality of articles and an optical scanning device operative to transmit/receive light energy to track the position/motion of each article.

In the broadest sense of the invention and referring to FIG. 1, the optical tracking system 10 includes a reflective surface 12 disposed along the feed path FP of an article 14 in motion and an optical scanning device 20 operative to (i) direct concentrated light energy 22 along a length L of the reflective surface 12 and (ii) receive at least a portion of this same light energy 22 upon its return from the reflector strip 12. The reflective surface 12 and optical scanning device 20 are disposed on opposing sides of the article 14 such that the return of light energy 22 is interrupted when the article 14 interposes the optical path of the concentrated light energy 22. Knowledge of the relative position of the optical scanning device 20 and the reflective surface 12 along with the angular orientation of the concentrated light energy 22, i.e., when the light energy 22 is absorbed or reflected, provides the necessary information to calculate the spatial location/orientation of the moving article 14.

In the context used herein "concentrated light energy" means any source of light energy, in the infrared, visible and ultraviolet light spectrums, which is sufficiently intense to return measurable energy back to its source. Generally, any light source which uses the principle of amplification of electromagnetic wave energy by stimulated emissions of radiation (i.e., laser light energy) will meet this criterion. However, under certain circumstances, high intensity collimated light will also satisfactorily perform this function. Moreover, in the context used herein, "reflective surface" means any reflector strip, element for surface capable of returning light energy to a sensing device.

In the preferred embodiment, the optical scanning device 20 is spatially positioned over or above the transport deck 28 such that the concentrated light energy 22 may sweep a large length of the reflector strip 12. Accordingly, the position and/or velocity of a plurality of articles 14 can be detected and monitored by a single optical scanning device 20.

In one embodiment of the invention, the optical scanning device 20 includes at least one movable mirror 24, e.g., oscillating or rotating mirror, a motor 30 for driving the mirror 24, and a position encoder 36 for providing a feedback signal indicative of the instantaneous angular or rotational position of the mirror 24. Furthermore, the optical scanning device 20 includes a light source 40 for producing the concentrated light energy 22, a receiver 50 for sensing light returned from the reflector strip 12, and a processor 60 for determining/tracking the light energy 22 sent/received and for calculating the instantaneous position of the article 14. A splitter 44 may be used for redirecting returned light energy 22 to the receiver 50, i.e., splitting the waves of light energy 22 to transmit light along one path P1 and reflecting light energy 22 along another path P2, e.g., at right angles, relative to the path P1 of light transmission.

Figure 2:
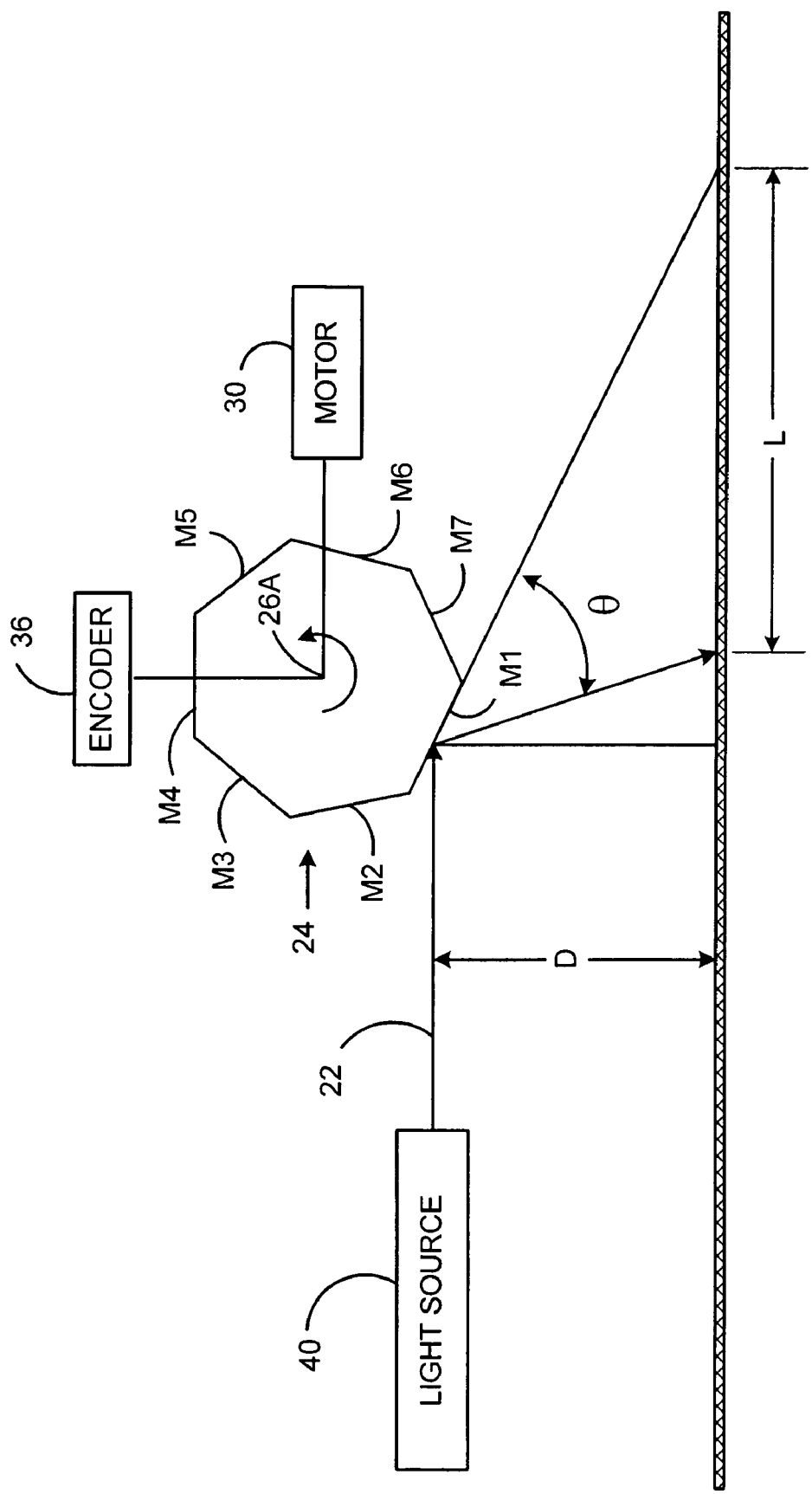
FIG. 2 is a simplified schematic view of the optical scanning device illustrating certain geometric considerations impacting the scanning angle and scanning frequency thereof.

In FIG. 2, the movable mirror 24 includes a rotating disc 26 having a plurality of mirrored surfaces M1-M7 defining a polygon shape. The mirrored surfaces M1-M7 are co-planar with the reflector strip 12 and are operative to direct light energy 22 generated from the light source 40 along a length L of the reflector strip 12. In the illustrated embodiment, the disc 26 includes seven (7) mirrored surfaces M1-M7 defining a heptagon shape and, consequently, is capable of delivering/reflecting light through a scan angle $\theta$ equal to the common angle (360/7) of the heptagon, or about 51.4 degrees. Furthermore, with seven (7) mirrored surfaces M1-M7, the light energy 22 may traverse the scan angle $\theta$ seven times with each revolution of the mirrored disc 26, i.e., a scan frequency of seven cycles/revolution. If a disc defined a triangular shape, i.e., a three-sided polygon, then a larger scan angle (360/3 or 120 degrees) is achievable, however, the scan frequency is reduced to three times per revolution. Consequently, a trade-off exists between the scan length and the scanning frequency—each being a function of the number of mirrored surfaces and the scan angle achievable by the shape selected, i.e., triangular, rectangular, heptagonal, hexagonal etc.

The mirrored disc 26 dually functions to transmit rays of light energy 22 to the target reflector strip 12 and receive light energy from the reflector strip 22. Consequently, one will note the orientation of each arrowhead on the rays of light energy 22 depicted in FIG. 1. Rays of light energy 22 directed toward and reflected from the reflector strip 12 include bi-directional arrowheads indicating that the light energy is returned to the mirrored disc 26. Rays of light energy 22 occluded by an article 14 such as a mailpiece on the transport deck 28, i.e., blocked from being returned by the reflector strip 12, include a single arrowhead indicative of light energy which is absorbed by or not reflected back to the mirrored disc 26.

Information relating to the scan timing, i.e., the moment in time that the light energy is transmitted, absorbed or returned, is coupled with other spatial relationships to determine the precise location/position/velocity of an article on the transport deck 28. More specifically, for the processor 60 to process the scanned data, additional information must be known or acquired including: (a) the relative positions of the optical scanning device 20 and the reflector strip 12, (b) the configuration of the mirrored disc 26 (the number of mirrored surfaces and scan angle), and (c) the instantaneous rotational position of the mirrored disc 26.

In FIGS. 1 and 2, the relative position of the optical scanning device 20 and the reflector strip 12, i.e., item (a) above, is simply a matter of measurement, i.e., the distance D measured from the optical scanning device 20 to the reflector strip 12. The configuration of the mirrored disc 26, item (b) above, provides information concerning the scanning length L, i.e., the length along the reflector strip 22 that the optical scanning device can send and receive optical signals. The scanning length L is also dependent upon the normal distance D measured from the reflector strip 12 to the mirrored disc 26. The rotational position of the mirrored disc, i.e., item (c) above, is obtained by a rotary encoder 36 coupled to the rotational axis 26A of the mirrored disc 26. This information, combined with the scanning data, i.e., the precise moment in time that the light energy 22 is transmitted, absorbed and/or is reflected, is used to calculate the location of an article. Over time, i.e., after several scan iterations, the movement and/or velocity of the article 14 can be calculated.

Depending upon the accuracy of location/tracking data needed, these calculations may be reactive or predictive. That is, the calculation may be performed once data is received (with the possible errors occurring during the course of the delay or lapse) or through a predictive analysis such as through Kaman filter regression analysis (with error anticipation for improved data accuracy). Notwithstanding the form of the calculation, the scan timing can be processed by a digital signal processor (DSP) to normalize the curved path to a linear data stream which corrects for spherical aberration effects. With respect to the latter, it will be appreciated that the transport deck intersects the light energy along a linear path, yet the scan timing is based upon a spherical model, assuming that the object/article interrupts the ray of light energy along a curved path of equal radii. To correct for this aberration, the curved path must be normalized to a linear data stream.

To further improve the granularity of the scanning data returned, the mirrored disc 26 is driven by the motor 30 in a direction opposing the feed path FP or linear travel of the article or mailpiece. That is, to improve the accuracy of the position data, it is preferable to cause the rays of light energy 22 to scan in a direction opposing the movement of the article. For example, rotation in the same direction requires the scanning rays to over-run the motion of the articles being tracked on the deck. If an article moves along the feed path at a linear velocity of over 100 inches per second (ips), the scanning rays must exceed this velocity in order to track article motion. If the scanning rays were traveling at an equal velocity, no tracking would occur inasmuch as the beam would proceed along the deck at the same velocity as the article. Similarly, if the scanning rays traveled at a lower velocity, no tracking would be possible. Hence, for tracking to occur, the scanning rays must travel at significantly higher velocity than the moving article.

On the other hand, if the scanning rays traveled in an opposite direction to the motion of the article, then tracking can occur at any velocity. Furthermore, by driving the scanning rays in a direction opposing the motion of the article, yet higher resolution tracking is possible. That is, inasmuch as the relative velocity between the scanning rays and the moving article is "additive" (i.e., objects moving in opposite directions), rather than "subtractive" (i.e., objects moving in the same direction), the optical scanning device 20 can receive many more data feedback signals (per increment of time).

Figure 3:
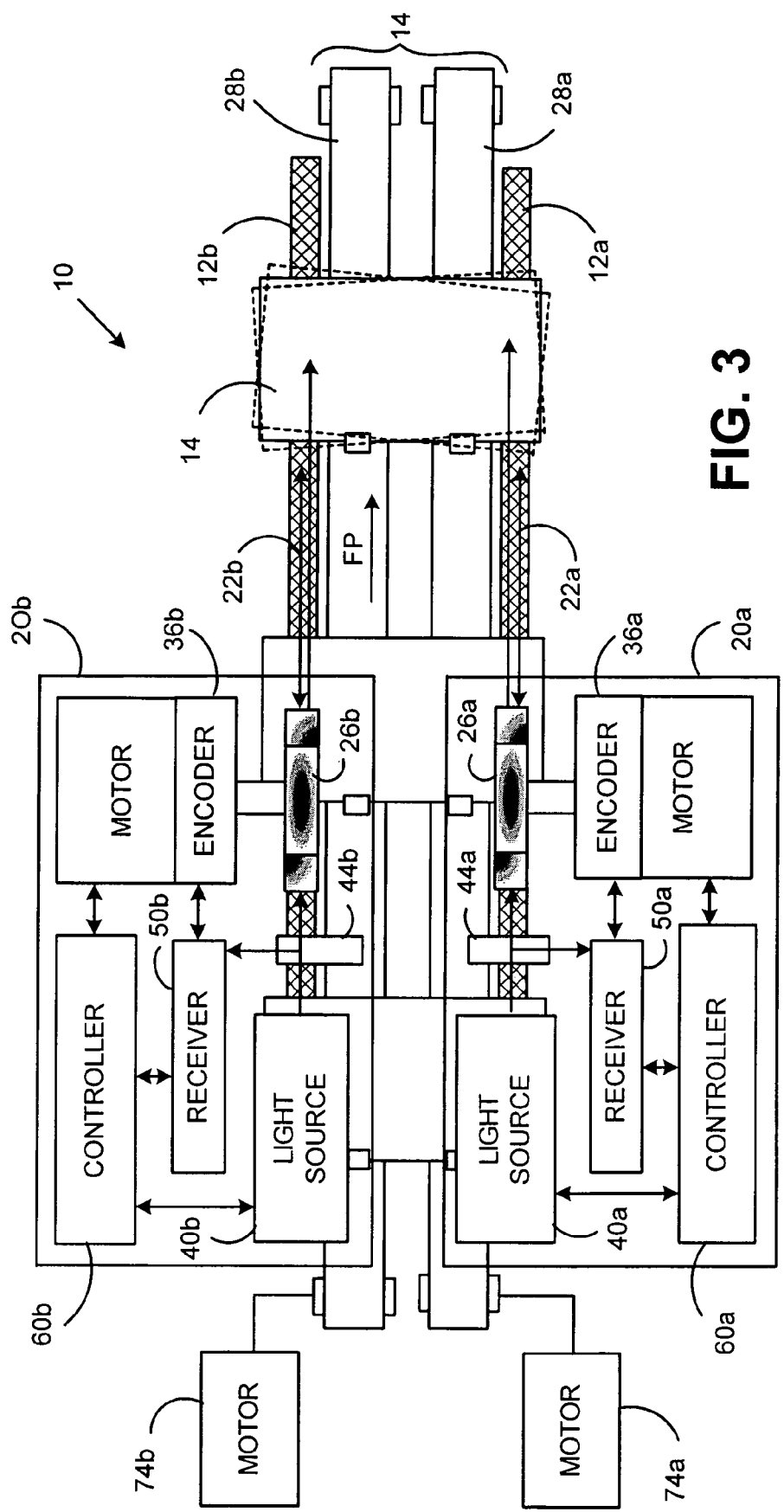
FIG. 3 depicts another embodiment of the optical position/motion tracking system including a pair of adjacent reflector strips disposed on either side of a central conveyor belt system.

In FIG. 3, another embodiment of the optical position/motion tracking system 10 is shown including a pair of adjacent reflector strips 12a, 12b disposed on either side of a central conveyor belt system 74. The articles 14 are conveyed along a feed path FP by a pair of belts 28a, 28b which are independently controlled and driven by respective motors 74a, 74b. In this embodiment of the invention, each of the reflector strips 12a, 12b is located to a side of the article 14 to determine its angular orientation relative to the belts 28a, 28b. Position information is obtained by optical scanning devices 20a, 20b having a dual light transmission and reception system. That is, a pair of mirrored discs 26a, 26b is co-planar with respective reflector strips 12a, 12b which send and receive light energy 22a, 22b in the much the same manner as previously described. Accordingly, the operation of elements such as the light sources 40a, 40b, receivers 50a, 50b, rotary encoders 36a, 36b and splitters 44a, 44b will not be described in any further detail in the context of this embodiment. While the operation of each is identical to that previously described, the dual nature of the optical scanning devices 20a, 20b provides position information in connection with opposing sides of the scanned articles 14.

Figure 4:
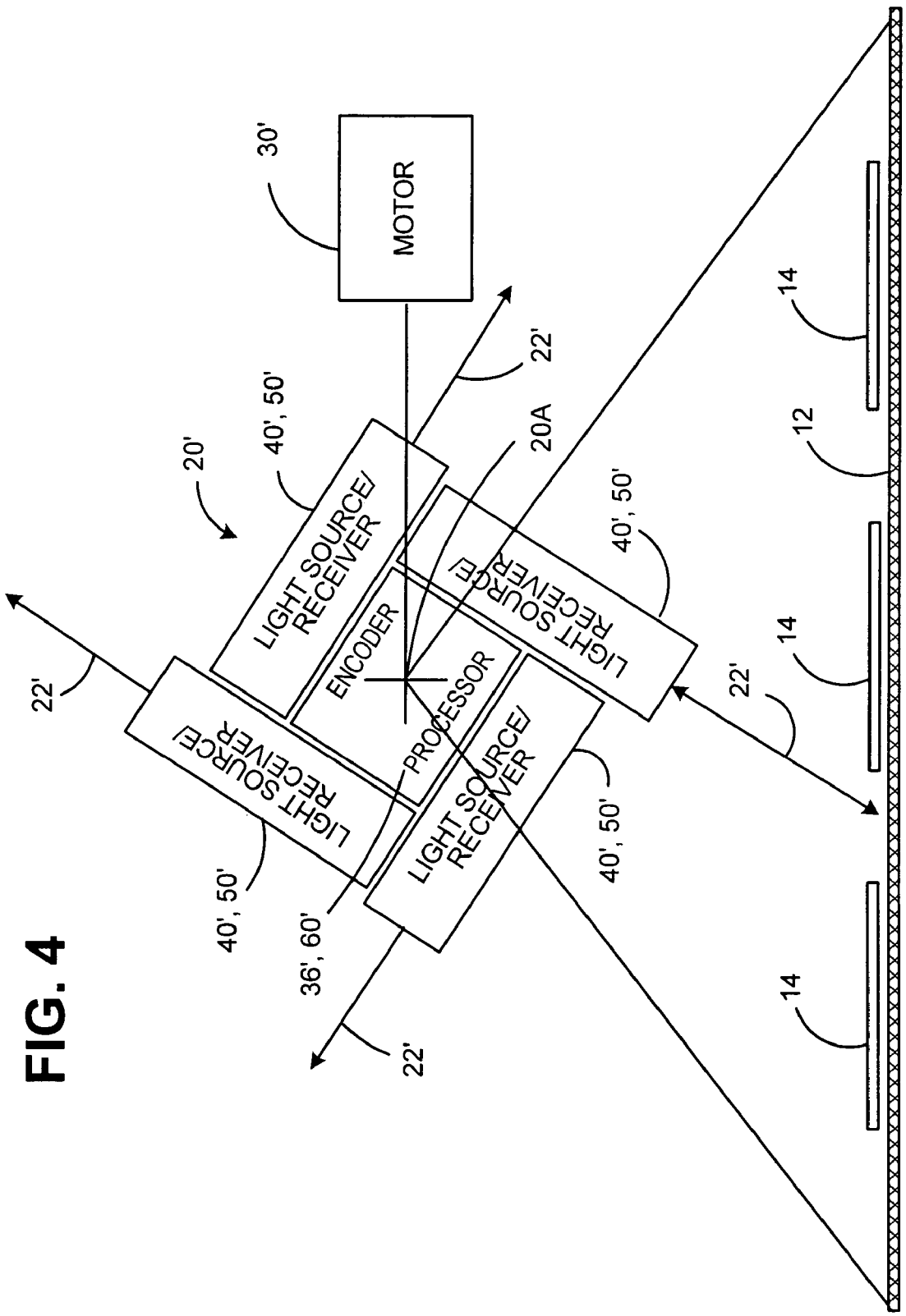
FIG. 4 is an alternate embodiment of the optical scanning device wherein the device is mounted for rotation about an axis for improved the scanning/geometric coverage.

In another embodiment of the invention shown in FIG. 4, the optical scanning device 20' is mounted about a rotational axis 20A and includes a plurality of light sources 40' each having a built-in receiver 50'. The light sources 40' are equally disposed about the rotational axis and are driven about the rotational axis by a central motor 30'. In this embodiment, rays of light energy 22' are driven in a plane orthogonal to the rotational axis 20A and are reflected back to the receiver 50' by the reflector strip 12. Inasmuch as the light energy 22' sweeps three-hundred and sixty degrees (360°) with each revolution, the optical scanning device 20' can detect and monitor the position of any article 14 disposed along the entire length of the reflector strip 12. That is, the scanning length is not limited by the geometry of a polygon-shaped mirrored disc 26 shown in prior embodiments of the invention.

Similar to prior embodiments of the invention, a processor 60' receives input from a rotary encoder 36' to acquire position data necessary for calculating the angular position of the transmitted/received light energy 22'. The rotary position data of the optical scanning device 20' in combination with absorption/reflection data provides a picture or shadow of the article(s) 14. In the described embodiment, four (4) light transmission and receiving sources 40', 50' scan the length of the reflector strip four (4) times with each revolution. Hence, by scanning the length of the reflector strip 12 four times/revolution, information regarding the spatial position and rate of change of position (or velocity) can be readily calculated by the processor 60'.

The optical tracking system 10 may also be described in terms of an inventive method for detecting and monitoring the spatial position/velocity of a moving article or mailpiece. In the broadest sense of the method, the receiver strip 12 is disposed adjacent the feed path and the optical scanning device is disposed remotely from the receiver strip 12 such that the article interposes an optical path produced by and between the optical scanning device and the reflector strip. The method further comprises the steps of: (a) transmitting the light energy produced by the optical scanning device along a length of the reflector strip, (b) sensing light energy returned from the reflector strip and issuing a signal indicative of a condition of the optical path, and (c) determining the spatial position of the article based upon the condition of the optical path. In the context used herein, the "condition of the optical path" means whether or not the optical path is complete or interrupted. That is, when the optical path is complete, light is transmitted from the light source 40 to a point along the length of the reflector strip 12 and returned to the receiver 50. Hence, the optical path is not interrupted. When the optical path is interrupted, the light is transmitted from the light source to a point along the reflector strip 12 which is occluded or absorbed by the article or mailpiece. Consequently, light energy is not returned to the receiver.

These method steps are performed by the various components and systems discussed previously herein. That is, the transmission of light energy may be performed by driving a multi-surfaced mirror about a rotational axis or mounting the entire optical scanning device about a rotational axis. With respect to the latter, the optical scanning device may transmit light energy along the entire length of the reflector strip 12.

In summary, the optical tracking system 10 provides a simple and reliable method for determining and/or monitoring the instantaneous spatial position and/or velocity of a moving article. Furthermore, the system 10 is capable of scanning over a relatively large area or length to rapidly determine the position of multiple articles 14 or targets. Additionally, the rotary nature of the optical scanning device 20 enables high frequency scanning for high fidelity data acquisition. Furthermore, by sweeping the light energy along a length of the reflector strip 12, the optical scanning device enables tracking of the article over an infinite number of points in space or along the entire length of the reflector strip 12. In contrast, the photocells employed in prior art tracking systems provide a limited number of points for sensing the position of the article along the transport deck. That is, while each photocell provides an opportunity for sensing the position of the article, the number of data points is limited by the number of photocells which can reasonably be installed or incorporated along the feed path of the article.

Furthermore, it is often necessary to make length and width adjustments to a transport deck for accommodating changes in the material being fed along the deck. When employing a prior art system, such adjustments typically involve extensive drilling and rework (for instance, drilling new holes for photocells and mounting brackets). In contrast, the optical tracking system of the present invention can readily accommodate such geometric alterations simply via programmatic/software modifications. Furthermore, the programmatic/software modifications can include changes to the output signal to replicate or mimic the output signals of a chain of photocells (such as those employed in the prior art). Such modifications facilitate retrofit operations wherein the inventive optical tracking system may be integrated with existing mail piece insertion systems.

Moreover, the optical scanning device 20 may be distally located relative to the article feed path to avoid dust and/or fiber contamination. Accordingly, the optical tracing system 10 of the present invention requires less maintenance while providing improved reliability. Finally, inasmuch as the principle components of the system 10 may be remotely located, i.e., the optical scanning device 20 is disposed some distance from the scanned article, the system 10 may be installed with only minor modification to existing conveyor systems/platforms. That is, the only challenge to system installation is the location of the reflector strips which must be in the line of sight of the light energy. By comparison to the tracking systems of the prior art, i.e., those which rely upon multiple photocell installations, the optical tracking system 10 of the present invention requires the installation of a single optical scanning device 20. As such, the installation of the optical tracking system 10 is significantly less complex and, accordingly, requires less maintenance and/or repair.

While the optical tracking system shows a dedicated reflective strip, it will be appreciated that the reflectance characteristics of the chassis itself, i.e., the structure supporting the transport deck, may be measured and used in place of the reflector strip/element. That is, if the surface provides a sufficient return of the light signal toward the sensor, e.g., has specular reflectance characteristics, to provide a measurable return signal, then reflectance measurements can be taken under various conditions, i.e., with and without a mail piece interrupting the light energy. If the difference is sufficiently measurable, a dedicated reflector strip may not be necessary, but only a surface prepared to reflect a threshold level of light energy. Ideally, a retro-reflector may be employed to provide maximum return, i.e., directional return, of the incident light energy.

While the optical tracking system 10 of the present invention shows the reflective surface 12 as a continuous reflective strip/element disposed beneath the plane of the feed path and/or to each side of the article 14, the reflective strip/element need not be continuous. For example, the reflective strip/element may comprise a plurality of discrete reflectors which are aligned with the rays of light produced by the optical scanning device 20. Furthermore, while the reflector strip/element 12 is substantially linear or horizontal in the illustrated embodiments, it should be appreciated that the reflector strip/element 12 may be curvilinear or have a wave-shaped profile depending upon the configuration of the transport deck or direction of the feed path.

It is to be understood that the present invention is not to be considered as limited to the specific embodiments described above and shown in the accompanying drawings. The illustrations merely show the best mode presently contemplated for carrying out the invention, and is susceptible to such changes as may be obvious to one skilled in the art. The invention is intended to cover all such variations, modifications and equivalents thereof as may be deemed to be within the scope of the claims appended hereto.

What is claimed is:

1. A system for tracking the spatial position of an article conveyed along a feed path, comprising:
   a reflective surface disposed along the feed path of the article, and
   an optical scanning device disposed remotely from the reflective surface such that the article interposes an optical path produced by and between the optical scanning device and the reflective surface, the optical scanning device, furthermore operative to transmit light energy along a length of the reflective surface, receive light energy returned from the reflective surface, and determine the spatial position of the article based upon a condition of the optical path.

2. The system according to claim 1 wherein the reflective surface is a continuous reflective element disposed adjacent the feed path of the article.

3. The system according to claim 1 wherein the reflective surface is a plurality of reflective elements adjacent the feed path of the article.

4. The system according to claim 1 wherein the optical scanning device includes at least one movable mirror for directing the light energy along the optical path, a motor for driving the mirror about a rotational axis, and a position encoder providing a position signal indicative of the rotational position of the movable mirror.

5. The system according to claim 4 wherein the movable mirror is mounted about a rotational axis and includes a plurality of mirrored surfaces defining a polygon-shaped mirrored disc, and wherein the motor drives the mirrored disc about the rotational axis to reflect the light energy from each of the mirrored surfaces.

6. The system according to claim 1 wherein the optical scanning device is mounted about a rotational axis, and further comprises a motor for driving the optical scanning device about the rotational axis.

7. The system according to claim 5 wherein the optical scanning device comprises a plurality of light transmission and receiving sources about an a rotational axis, and further comprising a motor for driving the plurality of light transmission and receiving sources about the rotational axis.

8. The system according to claim 1 wherein the optical scanning device transmits light energy along the reflective surface in a direction which opposes the feed path of the article.

9. A system for tracking the spatial position of a mailpiece conveyed along a transport deck of a mailpiece inserter system, comprising:
- a reflective surface disposed along the feed path and adjacent the transport deck of the mailpiece,
- an optical scanning device disposed remotely from the reflective surface and disposed on opposing sides of the article, the optical scanning device having a light transmission and receiving system including:
- a light source for transmitting light energy along an optical path,
- a sensor for receiving light energy returned from the reflective surface and issuing sensed signals indicative of a condition of the optical path,
- a means for directing the light energy along a length of the reflective surface and issuing a position signal indicative of the instantaneous position of the optical path; and
- a signal processor, responsive to the sensed and position signals, for determining the spatial position of the article based upon the condition of the optical path.

10. The tracking system according to claim 9 wherein the means for directing the light energy is a movable mirror, a motor for driving the movable mirror about a rotational axis, and a position encoder for issuing the position signal based upon the instantaneous position of the movable mirror.

11. The system according to claim 9 wherein the movable mirror is mounted about a rotational axis and includes a plurality of mirrored surfaces defining a polygon-shaped mirrored disc, and further comprising a motor for driving the mirrored disc about the rotational axis to reflect the light energy from each of the mirrored surfaces.

12. The system according to claim 9 wherein the optical scanning device is mounted about a rotational axis, and further comprises a motor for driving the optical scanning device about the rotational axis.

13. A method for tracking the spatial position of an article conveyed along a feed path, comprising the steps of:
- producing a reflective surface adjacent the feed path of the article,
- disposing an optical scanning device remotely from the reflective surface such that the article interposes an optical path produced by and between the optical scanning device and the reflective surface, the optical scanning device operative to transmit light energy,
- transmitting the light energy produced by the optical scanning device along a length of the reflective surface,
- sensing light energy returned from the reflective surface and issuing a signal indicative of a condition of the optical path, and
- determining the spatial position of the article based upon the condition of the optical path.

14. The method according to claim 13 further comprising the step of transmitting light energy along the reflective surface in a direction opposing the feed path of the article.

15. The method according to claim 13 wherein the step of transmitting light energy further comprises the steps of:
- providing movable mirror adapted for rotation about an axis, the movable mirror having a plurality of mirrored surfaces defining a polygon shape, and
- driving the movable mirror about the rotational axis to transmit the light energy along a length of the reflective surface.

16. The method according to claim 13 further comprising the step of:
- mounting the optical scanning device about a rotational axis; and
- driving the optical scanning device about the rotational axis to transmit the light energy along the reflective surface.

* * * * *